Patented Dec. 9, 1924.

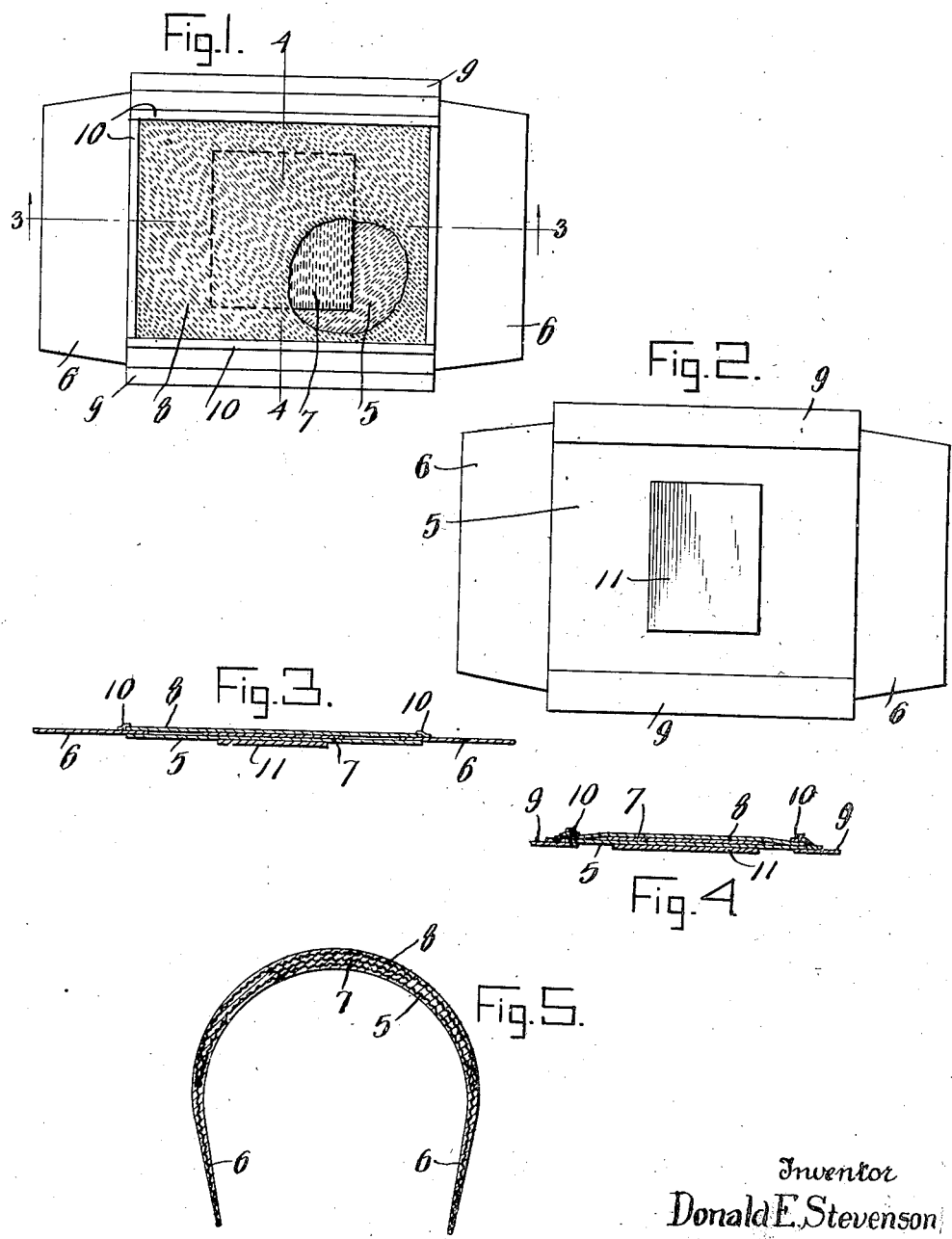

1,518,466

UNITED STATES PATENT OFFICE.

DONALD E. STEVENSON, OF INDIANAPOLIS, INDIANA.

TIRE BOOT.

Application filed December 29, 1920. Serial No. 433,854.

*To all whom it may concern:*

Be it known that I, DONALD E. STEVENSON, a citizen of the United States, residing at Indianapolis, in the county of Marion and State of Indiana, have invented certain new and useful Improvements in Tire Boots, of which the following is a specification.

The present invention relates to boots or patches for pneumatic tires, and consists of the combinations and arrangements of elements hereinafter described and particularly set forth in the accompanying claims.

The purpose of the invention is to provide a re-enforced boot or patch for pneumatic tires that will not creep or chafe either the inner tube or the inside of the shoe or casing, and one which can be readily applied to a tire and cannot be easily displaced therefrom.

Other objects and advantages will become apparent from the following specification and claims, reference being had to the accompanying drawing forming a part thereof, in which like characters of reference designate similar parts in the several views, of which:

Figure 1 is a view of the outside of the boot with a portion broken away to illustrate the manner of placing the layers of rubberized cord fabric;

Figure 2, a similar view of the inside of the boot showing a cushioning pad in position;

Figure 3, a section on the line 3—3 of Figure 1;

Figure 4, a section on the line 4—4 of Figure 1, and

Figure 5 a cross-section through the boot after having been vulcanized.

In the drawings, the boot shown is constructed of several plies of rubberized cord fabric before being vulcanized, and it consists of a base piece 5 cut on the bias with the weave thereof disposed as indicated by the dotted lines in Figure 1. On the opposite ends of the base piece 5 are vulcanized flaps 6 which project from said base piece as shown. An intermediate ply 7 of relatively smaller dimensions is next placed in the center of the base piece and is cut parallel with the weave. A third ply 8 of the same dimensions as the ply 5 is cut on the bias and disposed at right-angles to said piece 5 and vulcanized to the edges thereof through the flaps 6, thereby forming a boot or patch having the same tensile strength in all directions.

Narrow strips 9 of the same material as the members 5, 7 and 8 are placed along the edges of the top ply 8 and the whole upper edge is bound with a narrow strip of unvulcanized rubber compound 10, and on the under side of the base piece 5 is placed a thick layer of unvulcanized rubber compound 11 to act as a protecting cushion.

The several parts of the article as thus assembled are formed on a mandrel, securely wrapped under pressure, and subjected to a vulcanizing process which produces a boot having relatively smooth inner and outer surfaces and providing a strong puncture-proof patch or boot having the necessary flexibility for application to a tire.

It will be obvious, of course, that different forms of construction may be provided in lieu of that disclosed and described herein. While I have shown and described certain apparatus for accomplishing the result initially stated, it is to be understood that I am not limited to the precise details shown, but may adopt such modifications or changes within the scope of the claims to better suit the end in view.

Having thus described my invention, what I claim as new and desire to protect by United States Letters Patent is:

1. As an article of manufacture a blow-out patch composed of substantially coextensive fabric layers having an intermediate smaller fabric layer whose fibers extend at an angle to the fibres of the other layers, whereby a thickened portion is provided in the central region of the patch, substantially as set forth.

2. As an article of manufacture a blow-out patch comprising outside layers of fabric having between them a centrally arranged smaller layer and attaching flaps secured between the marginal portion of said outside layers, substantially as set forth.

3. The process of making a blow-out patch comprising arranging a pair of fabric pieces cut on the bias with their weaves extending in different directions, a fabric piece between said pair of fabric pieces, flaps at the edges of said outer fabric pieces, and a plurality of strips of unvulcanized rubber at the edges of the fabric pieces, and vulcanizing said patch whereby the exterior and interior surfaces are rendered smooth in appearance, substantially as set forth.

4. The process of making a blow-out patch comprises arranging inside and outside fabric pieces cut on their respective biases with their weaves extending substantially at right angles, a fabric piece between said inside and outside pieces, flaps at the edges of one of said fabric pieces, strips of unvulcanized rubber at the joints between the fabric piece and flaps, and a sheet of raw rubber disposed against the surface of the inner fabric piece, and subjecting said patch to a vulcanizing process whereby the exterior and interior surfaces are rendered smooth in appearance, substantially as set forth.

5. The process of making a tire boot comprising arranging inside and outside fabric pieces cut on their respective biases with their weaves extending substantially at right angles, a fabric piece between said inside and outside fabric pieces, flaps at the edges of said fabric pieces, strips of unvulcanized rubber at the joints between the fabric pieces and flaps, and a sheet of raw rubber disposed against the surface of the inner fabric piece, and subjecting said patch to a vulcanizing process whereby the exterior and interior surfaces are rendered smooth in appearance, substantially as set forth.

6. The process of making a tire patch comprising arranging a base fabric piece and a co-dimensional overlying fabric piece cut on their respective biases with their weaves at right angles, a smaller fabric piece located between said fabric pieces, flaps secured between the opposite side edges of said base and co-dimensional fabric pieces, strips secured at the opposite marginal edges of the base fabric piece, a rubber cementing strip at the attached marginal edges of said flaps and strips, and a cushioning strip underlying the medial portion of the base fabric piece, assembling the whole on a mandrel, wrapped under pressure, and vulcanized whereby the completed patch is rendered smooth on its interior and exterior surfaces, substantially as set forth.

In testimony whereof I affix my signature.

DONALD E. STEVENSON.